US012658463B2

(12) United States Patent
Lee et al.

(10) Patent No.: US 12,658,463 B2
(45) Date of Patent: Jun. 16, 2026

(54) SYSTEM AND METHOD FOR MANUFACTURING SECONDARY BATTERY

(71) Applicant: LG Energy Solution, Ltd., Seoul (KR)

(72) Inventors: Jeong Min Lee, Daejeon (KR); Shin Hwa Lee, Daejeon (KR); Jae Woong Yoo, Daejeon (KR); Eun Kyeong Lim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 543 days.

(21) Appl. No.: 18/035,883

(22) PCT Filed: Mar. 4, 2022

(86) PCT No.: PCT/KR2022/003124
§ 371 (c)(1),
(2) Date: May 8, 2023

(87) PCT Pub. No.: WO2022/186664
PCT Pub. Date: Sep. 9, 2022

(65) Prior Publication Data
US 2023/0420721 A1 Dec. 28, 2023

(30) Foreign Application Priority Data

Mar. 4, 2021 (KR) ........................ 10-2021-0029070
Mar. 3, 2022 (KR) ........................ 10-2022-0027707

(51) Int. Cl.
*H01M 10/04* (2006.01)
*B65G 57/04* (2006.01)
(52) U.S. Cl.
CPC ........ *H01M 10/0404* (2013.01); *B65G 57/04* (2013.01)

(58) Field of Classification Search
None
See application file for complete search history.

(56) References Cited

U.S. PATENT DOCUMENTS

| | | | |
|---|---|---|---|
| 2014/0020240 A1 | 1/2014 | Watanabe et al. | |
| 2014/0026400 A1 | 1/2014 | Yuhara et al. | |
| 2015/0090389 A1 * | 4/2015 | Min .................. | H01M 10/0404 156/60 |

FOREIGN PATENT DOCUMENTS

| | | |
|---|---|---|
| CN | 103460450 A | 12/2013 |
| JP | 2015159072 A | 9/2015 |

(Continued)

OTHER PUBLICATIONS

Extended European Search Report including Written Opinion for Application No. 22763645.3 dated Sep. 17, 2024. 8 pgs.

(Continued)

*Primary Examiner* — Wyatt P Mcconnell
(74) *Attorney, Agent, or Firm* — Lerner David LLP

(57) ABSTRACT

A system and method for manufacturing a secondary battery, in which air is suctioned in an opposite direction of a transfer direction inside a loading part to prevent a radical unit, which freely drops at an initial speed in the transfer direction, from colliding with the loading part, thereby reducing folding short defects that occur in a subsequent process. The system for manufacturing the secondary battery includes a transfer part configured to transfer a radical unit, a loading part configured to allow the radical unit transferred by the transfer part to drop in a direction of gravity so as to load the radical unit, and an intake part configured to suction air inside an inner space of the loading part from a side surface of the loading part.

18 Claims, 5 Drawing Sheets

(56)                    References Cited

FOREIGN PATENT DOCUMENTS

| | | | |
|---|---|---|---|
| JP | 2016-199357 | A | 12/2016 |
| JP | 2017084619 | A | 5/2017 |
| KR | 20140002016 | A | 1/2014 |
| KR | 10-2015-0111551 | A | 10/2015 |
| KR | 2015-0111551 | A | 10/2015 |
| KR | 2015-0136161 | A | 12/2015 |
| KR | 2015-0136163 | A | 12/2015 |
| KR | 2015-0136164 | A | 12/2015 |
| KR | 2015-0136165 | A | 12/2015 |
| KR | 2015-0136166 | A | 12/2015 |
| KR | 2015-0136167 | A | 12/2015 |
| KR | 2015-0136168 | A | 12/2015 |
| KR | 2015-0136169 | A | 12/2015 |
| KR | 2016-0076796 | A | 7/2016 |
| KR | 10-2016-0094182 | A | 8/2016 |
| KR | 2016-0094182 | A | 8/2016 |
| KR | 10-2017-0032042 | A | 3/2017 |
| KR | 2017-0032042 | A | 3/2017 |
| KR | 101773241 | B1 | 8/2017 |
| KR | 2017-0118447 | A | 10/2017 |
| KR | 101818076 | B1 | 1/2018 |
| KR | 2018-0094629 | A | 8/2018 |
| KR | 10-2043113 | B1 | 12/2019 |
| KR | 10-2020-0137927 | A | 12/2020 |
| KR | 2020-0137927 | A | 12/2020 |
| WO | 2019148466 | A1 | 8/2019 |

OTHER PUBLICATIONS

International Search Report for PCT/KR2022/003124 mailed Jun. 17, 2022. 3 pgs.
Search Report dated Aug. 28, 2025 from the Office Action for Chinese Application No. 2022800071014 issued Aug. 30, 2025. 3 pgs., (see p. 1-2, categorizing the cited references).

* cited by examiner a process of transferring a radical unit by a
transfer part a process of loading the radical unit in a
loading part

FIG. 8

SYSTEM AND METHOD FOR MANUFACTURING SECONDARY BATTERY

CROSS-REFERENCE TO RELATED APPLICATION

The present application is a national phase entry under 35 U.S.C. § 371 of the International Application No. PCT/KR2022/003124 filed on Mar. 4, 2022, which claims the benefit of the priority of Korean Patent Application Nos. 10-2021-0029070, filed on Mar. 4, 2021, and 10-2022-0027707, filed on Mar. 3, 2022, which are hereby incorporated by reference in their entireties.

FIELD OF THE INVENTION

The present invention relates to a system and method for manufacturing a secondary battery, and more particularly, to a system and method for manufacturing a secondary battery, in which air is suctioned in an opposite direction of a transfer direction inside a loading part to prevent a radical unit, which freely drops at an initial speed in the transfer direction, from colliding with the loading part, thereby reducing folding short defects that occur in a subsequent process.

BACKGROUND OF THE INVENTION

A secondary battery is a chargeable and dischargeable battery unlike a primary battery that is not chargeable. The secondary battery is widely used not only in small electronic devices such as mobile phones and laptops, but also in large products requiring high output such as electric vehicles, power storage devices that store surplus power or renewable energy, and power storage system (ESS) for backup.

The secondary battery has a structure in which an electrode assembly and an electrolyte are embedded in a case such as a can or a pouch. The electrode assembly has a structure in which a positive electrode, a separator, and a negative electrode are repeatedly stacked. Representatively, the electrode assembly may be classified into a jelly-roll type (winding type) electrode assembly that is manufactured by winding long sheet-shaped positive electrodes and negative electrodes with a separator therebetween, a stacked type electrode assembly that is manufactured by sequentially stacking a plurality of positive electrodes and negative electrodes, which are cut into units each of which has a predetermined size, with a separator therebetween, and a stack and folding type electrode assembly.

A lamination & stacking method has recently been developed as a new method for manufacturing an electrode assembly to increase in energy density and reduce a process time in the same space.

Referring to the manufacturing process according to the lamination and stacking method, cut electrodes are disposed at predetermined intervals on upper portions of one or more separators that are continuously supplied. Thereafter, in a heating process, the electrodes and the separator, which are combined to improve bonding force between the separator and the electrodes. In a bonding process, an electrode stack, in which the separator and the electrodes are stacked (in a state in which unit cells or radical units are formed to be spaced a predetermined interval from each other) passes through a pair of rollers so as to be rolled so that the electrodes and the separator are bonded to each other by heat and a pressure. Thereafter, the stacked electrodes and separator are cut into unit cells, and the cut unit cells are transferred and stacked to form an electrode assembly.

A system for manufacturing a secondary battery according to the related art is illustrated in FIG. 1. Referring to a stacking process of unit cells in detail with reference to FIG. 1, cut unit cells 1 are transferred by a transfer means 2 such as a conveyor belt and are pressed by a pusher 3 and thus are separated from the transfer means 2 to drop into a magazine 4 disposed below the transfer means 2 so as to be loaded. In recent years, due to an increase in linear velocity of a process and an introduction of a high-speed facility, unlike the related art, in the process of dropping of the unit cells 1, a case in which the unit cells collide with a side surface of the magazine 4 due to a transfer speed $V_H$ in a horizontal direction occurs frequently, resulting in problems such as occurrence of breakage or cracks of the unit cells 1 occur.

As described above, when the unit cells are damaged, an electrode is exposed to damage a battery case. As a result, quality problems such as corrosion of the battery case, and leakage of an electrolyte, and the like occur to deteriorate reliability of a product. In addition, it may cause short-circuit defects in folding that is a subsequent process and lead to accidents such as ignition and explosion of the battery and thus greatly threaten safety of a user. Therefore, there is a need to develop a process and system for manufacturing a secondary battery capable of solving the above problems.

BRIEF SUMMARY OF THE INVENTION

The present invention has been devised to solve the above problems, and an object of the present invention is to provide a system and method for manufacturing a secondary battery, in which air is suctioned in an opposite direction of a transfer direction inside a loading part to prevent a radical unit, which freely drops at an initial speed in the transfer direction, from colliding with the loading part, thereby reducing folding short defects that occur in a subsequent process.

A system for manufacturing a secondary battery according to the present invention includes a transfer part configured to transfer a radical unit, a loading part configured to allow the radical unit transferred by the transfer part to drop in a direction of gravity so as to load the radical unit, and an intake part configured to suction air inside an inner space of the loading part from a side surface of the loading part.

The intake part may generate a flow of the air in a reverse direction of the transfer direction in the inner space of the loading part.

In the intake part, an intake pressure may gradually decrease from an upper portion toward a lower portion of the loading part.

The system may further include a pressing part configured to press the radical unit transferred by the transfer part so that the radical unit drops into the loading part.

The transfer part may include a transfer belt configured to adsorb the radical unit at a top surface of the radical unit to transfer the radical unit.

The transfer belt may be provided in plurality, which are spaced apart from each other in a direction vertical to a transfer direction of the radical unit, and the plurality of transfer belts may adsorb one radical unit together to transfer the radical unit.

The pressing part may press the radical unit exposed between the plurality of transfer belts downward from an upper side so that the radical unit drops into the loading part.

The loading part may include a lower plate on which the radical unit is seated, a first side plate formed as a surface perpendicular to one edge of the lower plate, wherein a normal vector direction of the surface is parallel to the transfer direction, and a second side plate formed to face the first side plate at the other edge of the lower plate, wherein the first side plate may be disposed closer to a transfer start point of the radical unit when compared to the second side plate.

The intake part may include a first intake part provided in the first side plate to suction the air in a reverse direction of the transfer direction of the transfer part.

The first intake part may be disposed over upper and lower portions of the first side plate.

The intake part may further include a second intake part provided in the second side plate to suction the air in the transfer direction of the transfer part.

The second intake part may be disposed over upper and lower portions of the second side plate.

In the intake part, a pressure of the first intake part may be greater than a pressure of the second intake part at an upper portion of the lading part, and a pressure of the first intake part may be the same as the pressure of the second intake part at a lower portion of the loading part.

The pressure of the second intake part may be constant over the upper and lower portions of the second side plate, and the pressure of the first intake part may decrease from an upper portion of the first side plate up to a preset point of the first side plate, but be the same as the pressure of the second intake part from the preset point of the first side plate up to a lower portion of the first side plate.

The pressure of the first intake part may be constant over upper and lower portions of the first side plate, and the pressure of the second intake part may increase from the upper portion of the second plate up to a preset point of the second side plate, but be the same as the pressure of the first intake part from the preset point of the second side plate up to the lower portion of the second side plate.

The loading part may further include a third side plate formed to connect the first side plate to the second side plate at an edge of the lower plate and a fourth side plate formed to connect the first side plate to the second side plate at the edge of the lower plate and face the third side plate.

A method for manufacturing a secondary battery according to the present invention includes transferring a radical unit by a transfer part, and allowing the radical unit to drop in a direction of gravity to load the radical unit in a loading part, wherein the loading of the radical unit include a pressing process of pressing the radical unit to drop into the loading part, and an intake process of suctioning air within the loading part from a side surface of the loading part through an intake part.

In the intake process, a first intake part may suction the air within the loading part in a reverse direction of a transfer direction, and a second intake part may suction the air in the transfer direction, wherein a pressure of the first intake part may be greater than a pressure of the second intake part at an upper portion of the lading part, and a pressure of the first intake part may be the same as the pressure of the second intake part at a lower portion of the loading part.

The system for manufacturing the secondary battery according to the present invention may include the transfer part that transfers the radical unit, the loading part, in which the radical unit transferred by the transfer part drops in the gravity direction and is loaded, and the intake part that suctions air into the inner space of the loading part from the side surface of the loading part. Therefore, the air may be suctioned in the opposite direction of the transfer direction inside the loading part to prevent the radical unit, which freely drops at the initial speed in the transfer direction, from colliding with the loading part, thereby reducing the folding short defects that occur in the subsequent process.

BRIEF DESCRIPTION OF THE DRAWINGS

Figure 8:
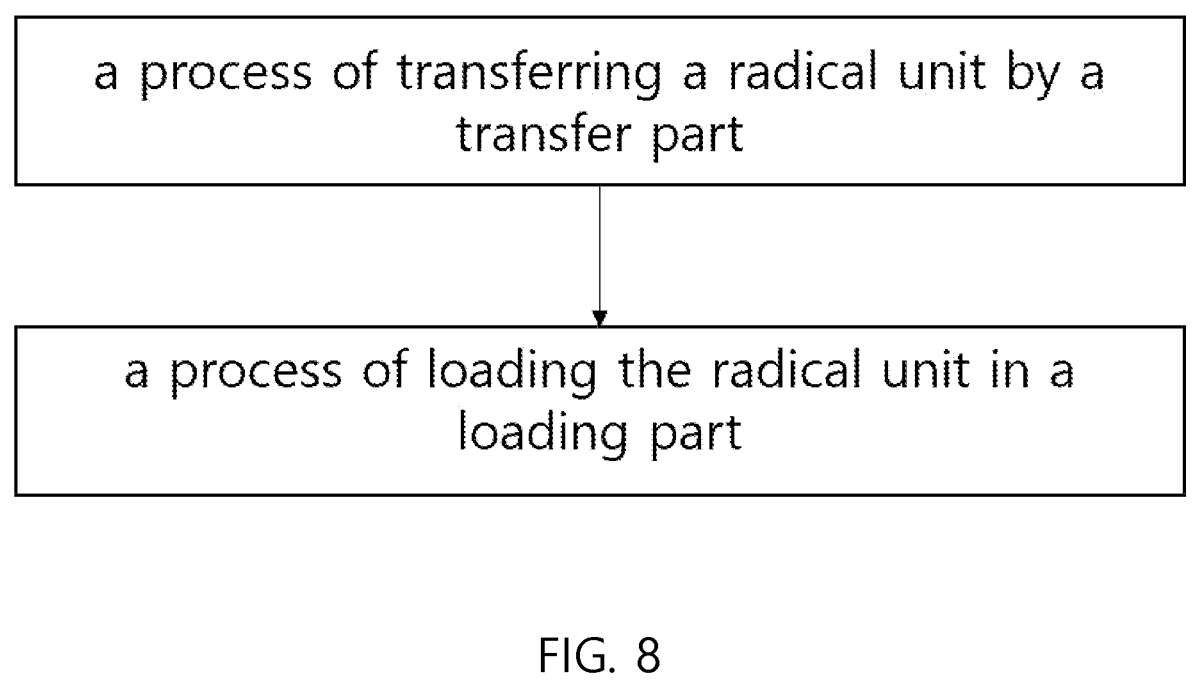

FIG. 8 is a flowchart illustrating method for manufacturing a secondary battery.

DETAILED DESCRIPTION

Figures 1, 2:
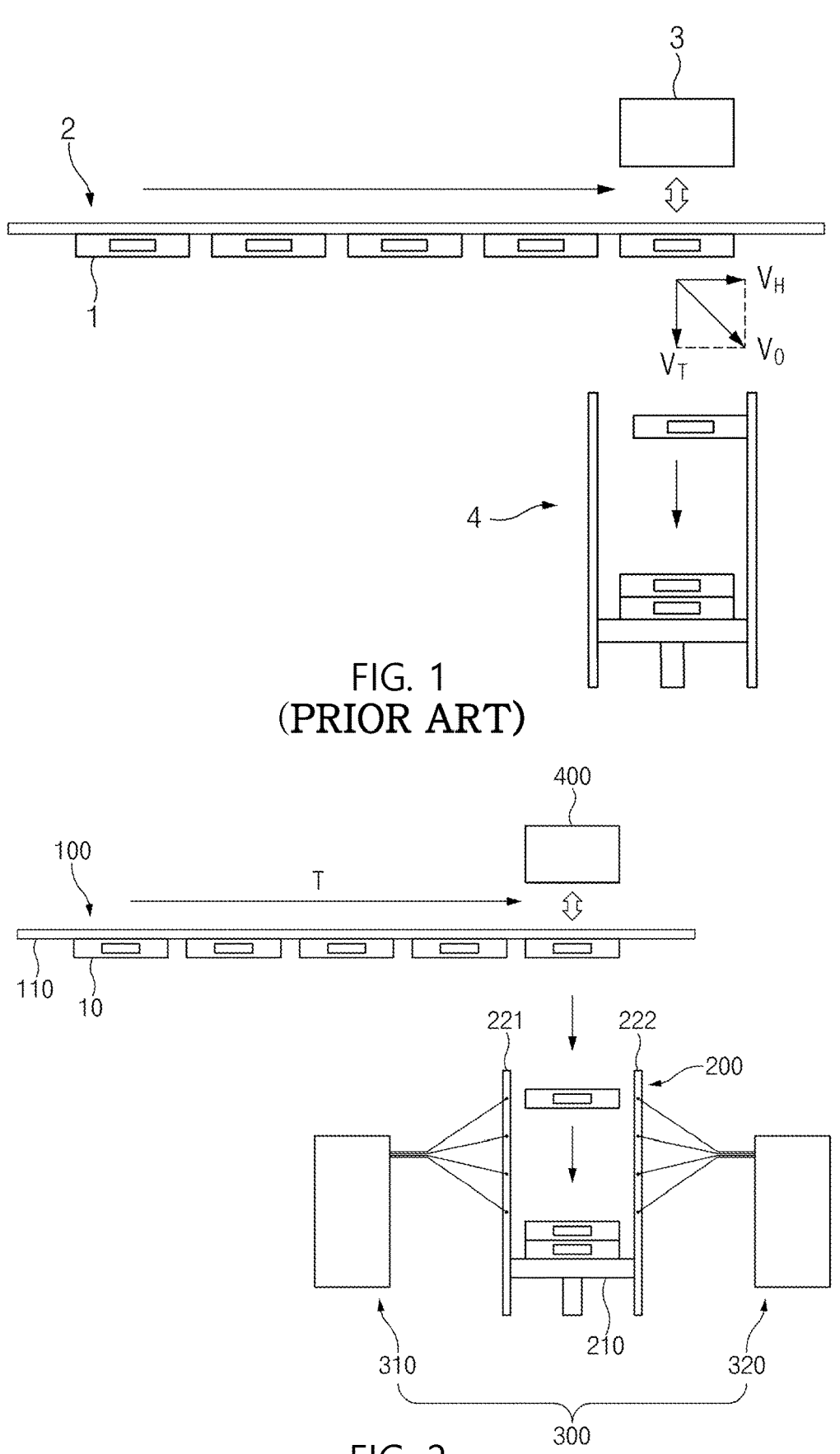
FIG. 1 is a view illustrating a system for manufacturing a secondary battery according to a related art.
FIG. 2 is a view illustrating a system for manufacturing a secondary battery according to Embodiment 1 of the present invention.

Hereinafter, preferred embodiments of the present invention will be described in detail with reference to the accompanying drawings so that those of ordinary skill in the art can easily carry out the present invention. However, the present invention may be implemented in several different forms and is not limited or restricted by the following examples.

In order to clearly explain the present invention, detailed descriptions of portions that are irrelevant to the description or related known technologies that may unnecessarily obscure the gist of the present invention have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Embodiment 1

Figures 3, 4:
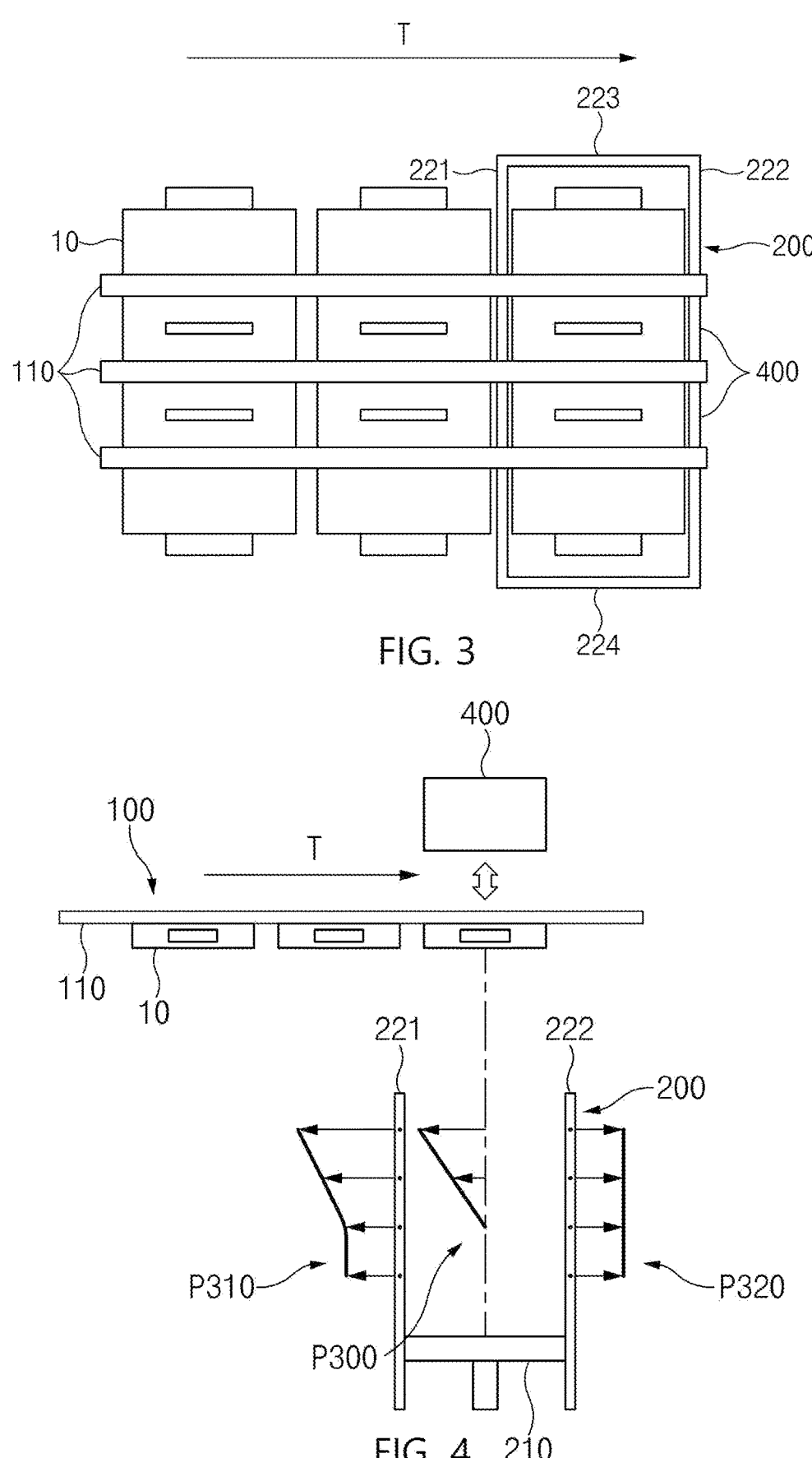
FIG. 3 is a plan view illustrating a transfer part that transfers a radical unit, a loading part, and a pressing part in the system for manufacturing the secondary battery according to Embodiment 1 of the present invention.
FIG. 4 is a view illustrating an intake pressure due to an intake part of the system for manufacturing the secondary battery according to Embodiment 1 of the present invention.

FIG. 2 is a view illustrating a system for manufacturing a secondary battery according to Embodiment 1 of the present invention. FIG. 3 is a plan view illustrating a transfer part that transfers a radical unit, a loading part, and a pressing part in the system for manufacturing the secondary battery according to Embodiment 1 of the present invention. FIG. 4 is a view illustrating an intake pressure due to an intake part of the system for manufacturing the secondary battery according to Embodiment 1 of the present invention.

Referring to FIG. 2, a system for manufacturing a secondary battery according to the present invention includes a transfer part 100, a loading part 200, and an intake part 300. The transfer part 100 transfers a radical unit 10, the radical unit 10 transferred by the transfer part 100 drops in a gravity direction and then is loaded in the loading part 200, and the intake part 300 suctions air in an inner space of the loading part 200 from a side surface of the loading part 200.

The radical unit 10 may be a main component of an electrode assembly and have the form of a bi-cell, in which a positive electrode, a separator, a negative electrode, a separator, and a positive electrode are sequentially stacked, but the present invention is not limited thereto. The radical units 10 may refer to various types of cells in which electrodes and separators are stacked.

In the system for manufacturing the secondary battery according to the present invention, the intake part 300 may suction the air in the inner space to reduce shaking of the radical unit 10, which drops in the loading part 200, thereby preventing the radical unit 10 and the loading part 200 from colliding with each other and thus may prevent the radical unit 10 from being damaged to reduce folding short defects that may occur in a subsequent process.

In addition, the system for manufacturing the secondary battery according to Embodiment 1 of the present invention may further include a pressing part 400 that presses the radical unit 10 transferred by the transfer part 100 to allow the radical unit to drop into the loading part 200. The pressing part 400 may be in the form of a pusher that instantaneously presses the radical unit 10 toward a lower side at which the loading part 200 is disposed. As described above, according to the present invention, the pressing part 400 may be further provided to effectively separate the radical unit 10 from the transfer part 100 that is a high-speed facility and then to allow the radical unit 10 to drop into the loading part 200 so that the radical unit 10 within the loading part 200 is loaded in a vertically aligned state. In addition, force in a vertical direction may be applied to generate a speed of the radical unit 10 in the vertical direction and thus minimize a horizontal moving distance of the radical unit 10 having a moving speed in a transfer direction T, thereby minimizing the collision with the loading part 200.

Hereinafter, specific configurations of the transfer part 100, the loading part 200, the intake part 300, and the pressing part 400 will be described in detail.

First, the transfer part 100 may include a driving roller connected to a motor shaft of a driving motor, a driven roller arranged in parallel to the driving roller, and a transfer belt coupled to the driving roller and the driven roller to perform a caterpillar operation and transfer the radical unit 10. Here, an adsorption hole may be formed in the transfer belt 110 and be connected to a vacuum pump to grip a cut radical unit 10, which is continuously supplied, on a top surface thereof, thereby transferring the radical unit 10 to the loading part 200.

Referring to FIG. 3, the transfer belt 110 is provided in plurality, which are spaced apart from each other in a direction vertical to the transfer direction T of the radical unit 10 so that the plurality of transfer belts 110 grip one radical unit 10 together to transfer the radical unit 10. Thus, the radical unit 10 may be transferred while being stably gripped to the transfer belt 110 in the horizontal state. In addition, since the plurality of conveying belts 110 are provided to be spaced apart from each other, the pressing part 400 to be described later may easily press the radical unit 10.

The pressing part 400 may be a pusher having a cam structure, but is not limited thereto, and as illustrated in FIGS. 2 and 3, the pressing part 400 may be configured to press the radical unit 10 exposed between the plurality of transfer belts 110 downward from an upper side so as to drop into the loading part 200. As a result, the radical unit 10 that is continuously supplied and transferred from the transfer part 100 that is the high-speed facility may be effectively separated to be loaded in the loading part 200.

In summary of the transferring and pressing of the radical unit 10 by the transfer part 100 and the pressing part 400, which are described above, the transfer belt 110 may grip the radical unit 10 formed to be cut and transfer the radical unit to the loading part 200, and the pressing part 400 may press the radical unit 10 from an upper side of the loading part 200 to separate the radical unit 10 gripped to the transfer belt 110 and allow the radical unit 10 to drop, thereby loading the radical unit into the loading part 200.

Next, referring to FIGS. 2 and 3, the loading part 200 may include a lower plate 210 on which the radical unit 10 is seated and which has a square shape corresponding to a shape of the radical unit 10, and first, second, third, and fourth side plates 221, 222, 223, and 224 respectively formed as surfaces perpendicular to four edges of the lower plate 210.

The first side plate 221 may be formed as a surface perpendicular to one edge of the lower plate 210, and a normal vector direction of the surface may be parallel to the transfer direction T of the radical unit 10 of the transfer part 100. The second side plate 222 may be formed to face the first side plate 221 at the other edge of the lower plate 210. Here, the first side plate 221 may be disposed closer to a transfer start point of the radical unit 10 when compared to the second side plate 222. As described above, since the loading part 200 according to Embodiment 1 of the present invention includes the first side plate 221 and the second side plate 222, even though the radical unit 10 drops at a horizontal speed of the transfer direction T, the radical unit 10 may be seated in a state of being aligned with the loading part 200, and also, the intake part 300 to be described later may be provided in each of the first side plate 221 and the second side plate 222 to stably load the radical unit 10.

The third side plate 223 may be formed to connect the first side plate 221 to the second side plate 222 at the edge of the lower plate 210, and the fourth side plate may be formed to connect the first side plate 221 to the second side plate 222 at the edge of the lower plate 210 and to face the third side plate 223. That is, when viewed from above, in the loading part 200, the lower plate 210 may be formed on a bottom part, and the third side plate 223, the second side plate 222, and the fourth side plate may be sequentially formed in a clockwise direction with respect to the first side plate 221 formed at an edge of one side of the lower plate 210. As described above, since the four edges of the lower plate 210, on which the radical unit 10 is seated, are formed to be surrounded by the four side plates, the radical unit 10 may be stably loaded in the state of being aligned, and the loaded radical unit 10 may be protected against foreign substances introduced from the outside and external impacts.

Next, referring to FIGS. 2 to 6, the intake part of the present invention will be described in detail. First, referring to FIG. 2, the intake part 300 according to Embodiment 1 of the present invention may generate a flow of air in a reverse direction of the transfer direction T in the inner space of the loading part 200. The radical unit 10 separated from the transfer part 100 to drop has an initial speed along the horizontal direction, which is the transfer direction T, in addition to the speed in the direction of gravity. Particularly, in the high-speed facility, even after being separated from the transfer part 100, the radical unit 10 may collide more strongly with the loading part 200 such as a magazine due to the high-speed horizontal initial speed. Therefore, the present invention may include the intake part 300, and the intake part 300 may generate the air flow in the reverse direction of the transfer direction T in the inner space of the loading part 200 to decelerate the initial speed in the transfer direction T of the dropping radical unit 10, thereby preventing the radical unit 10 from colliding with the loading part 200 and being damaged.

In addition, in the intake part 300, an intake pressure may gradually decrease from an upper portion to a lower portion of the loading part 200. Here, the intake pressure P300 of the intake part 300 means a net pressure in the reverse direction of the transfer direction T generated inside the loading part 200 as illustrated in FIG. 4. The intake pressure P300 inside the loading part 200 by the intake part 300 is formed to be large at the upper portion of the loading part 200 having a large initial speed in the horizontal direction, thereby reducing the initial speed of the radical unit 10 in the horizontal direction. Thereafter, as the radical unit 10 moves downward, that is, as the radical unit 10 drops while receiving force in the reverse direction of the transfer direction T by the intake pressure, the initial speed in the horizontal direction may gradually decrease, and thus, the intake pressure P300 may gradually decrease downward. The intake pressure P300 inside the loading part 200 may be zero at a point at which the initial speed in the horizontal direction is completely offset while the radical unit 10 drops. As a result, the radical unit 10 may be seated on the lower plate 210 or the previously stacked radical unit 10 without colliding with the first side plate 221 or the second side plate 222 of the loading part 200 inside the loading part 200.

Figures 5, 6:
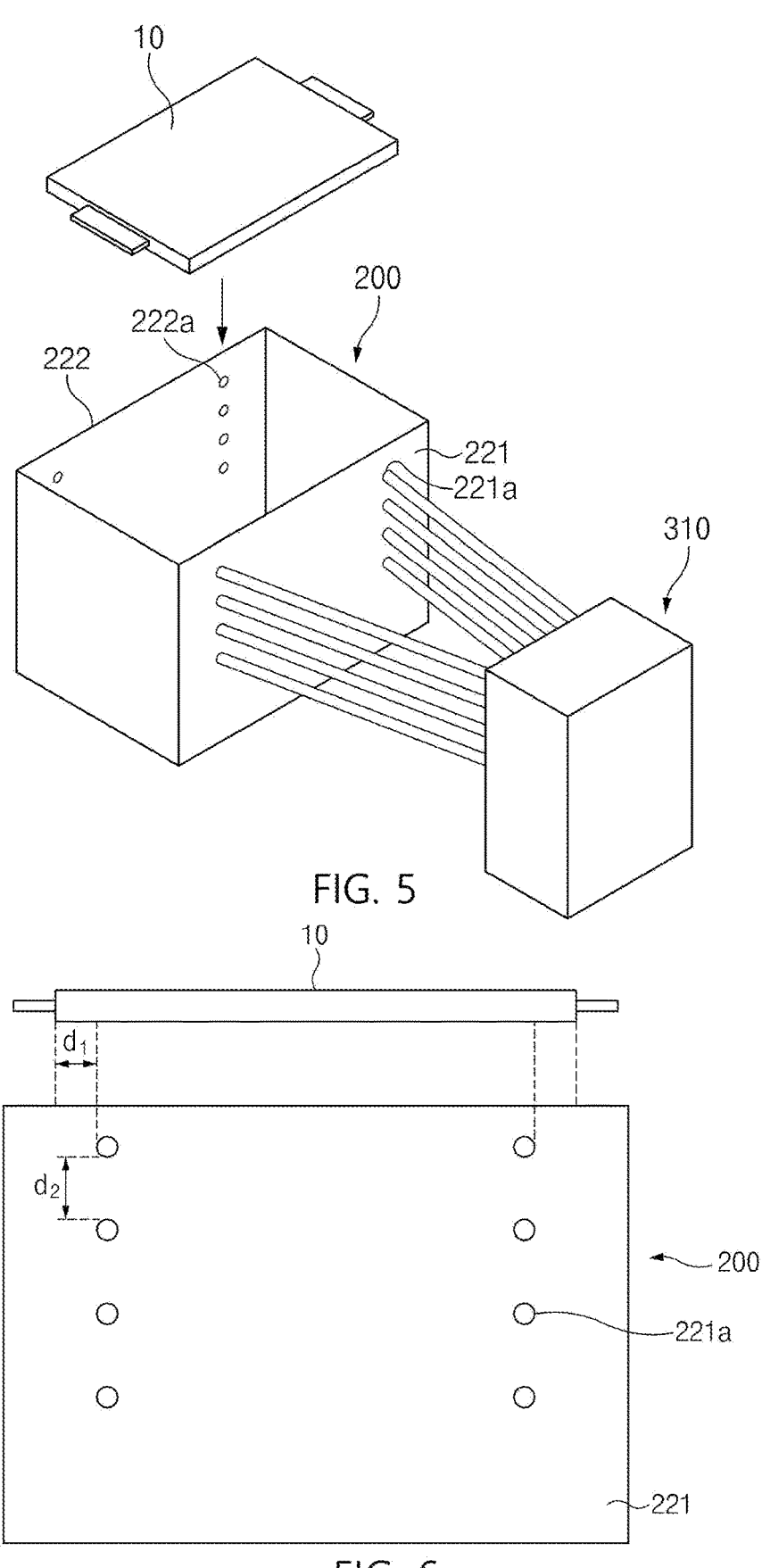
FIG. 5 is a view illustrating the intake part provided on a first side plate of the loading part in the system for manufacturing the secondary battery according to Embodiment 1 of the present invention.
FIG. 6 is a side view illustrating the first side plate of the loading part in the system for manufacturing the secondary battery according to Embodiment 1 of the present invention.

FIG. 5 is a view illustrating the intake part provided on the first side plate of the loading part in the system for manufacturing the secondary battery according to Embodiment 1 of the present invention. FIG. 6 is a side view illustrating the first side plate of the loading part in the system for manufacturing the secondary battery according to Embodiment 1 of the present invention.

As illustrated in FIGS. 4, 5, and 6, the intake part 300 may include a first intake part 310 provided in the first side plate 221 to suction air in the reverse direction of the transfer direction of the transfer part 100. The first intake part 310 may include a vacuum pump and a hose connecting the vacuum pump to the first side plate 221. In addition, an intake hole 221a may be formed in the first side plate 221, and in the first intake part 310, the hose may be connected to the intake hole 221a of the first side plate 221 to generate an intake pressure P310 by the first intake part inside the loading part 200. Thus, the initial speed of the radical unit 10 in the horizontal direction may be reduced to prevent the radical unit 10 from colliding with the loading part 200.

The first intake part 310 may generate the intake pressure P310 only at an upper portion of the first side plate 221, but a plurality of intake holes 221a may be formed over the upper and lower portions of the first side plate 221, and the plurality of hoses may be respectively connected to the intake holes 221a so as to be disposed over the upper and lower portions of the first side plate 221. As a result, the intake pressure P310 may be continuously supplied until the initial speed of the dropping radical unit 10 in the horizontal direction becomes zero to effectively prevent the radical unit 10 from colliding.

For example, as illustrated in FIGS. 5 and 6, eight intake holes 221a may be formed in the first side plate 221, preferably in the form of 4 rows 2 columns. Here, a distance d2 between the rows may be at least 30 mm to minimize an interference of the intake pressure generated in the intake hole 221a and an occurrence of an eddy in the loading part 200.

In addition, the position of the intake hole 221a may vary depending on a length of a long side of the radical unit 10, and the intake hole 221a may be formed at a position moving from a shoulder portion of the radical unit 10 by a predetermined distance d1 toward a central portion of the radical unit 10 based on the radical unit 10 inserted into the loading part 200. Here, the shoulder portion of the radical unit 10 may mean an end of a body of the radical unit 10 excluding a portion at which a tab protrudes from the radical unit 10. When the predetermined distance d1 is too short, the intake pressure and the air flow may not be sufficiently transmitted to the radical unit 10, and when the predetermined distance d1 is too long, there is a fear that the collision with the loading part 200 occur at the shoulder portion of the radical unit 10. Therefore, the predetermined distance d1 may be designed to be an appropriate distance so that the intake pressure and the air flow are sufficiently transmitted to the radical unit 10, and also, the shoulder portion does not collide with the loading part 200. Preferably, the predetermined distance d1 may be 19 mm to 21 mm. The total intake pressure generated in the first intake part 310 may be minimum 100 bar and maximum 500 bar.

The intake part 300 may include only the first intake part 310 as described above, but may further include, as illustrated in FIG. 2, a second intake part 320 provided on the second side plate 222 to suction air in the transfer direction of the transfer part 100. Configurations of a vacuum pump and a hose of the second intake part 320 and an intake hole formed in the second side plate 222 may be understood as the same as those of the first intake part 310 and the first side plate 221 except that the second intake part 320 generates an intake pressure P320 in a different air suction direction. In addition, the second intake part 320 may also be disposed over upper and lower portions of the second side plate 222, and a plurality of intake holes 222a may be formed in the second side plate 222 as illustrated in FIG. 5. As described above, when the intake part 300 further includes the second intake part 320 in the system for manufacturing the secondary battery according to Embodiment 1 of the present invention, the intake pressures P310 and P320 at both surfaces of the loading part 200 may be generated to be balanced, thereby preventing an eddy from being generated inside the loading part. As a result, the dropping radical unit 10 may be reduced in vibration, and thus, the radical unit 10 may be stacked in a more aligned state.

When the intake part 300 includes both the first intake part 310 and the second intake part 320, referring to intensities of the pressures P310 and P320 by the first intake part 310 and the second intake part 320 with reference to FIG. 4, in the intake part 300, the pressure P310 of the first intake part may be greater than the pressure P320 of the second intake part at the upper portion of the loading part 200, and the pressure P310 of the first intake part may be the same as the pressure P320 of the second intake part at the lower portion of the loading part 200. As a result, the net pressure P300 may be generated in the reverse direction of the transfer direction T by the intake part 300 at the upper portion of the loading part 200, and the pressures P310 and the P320 by the first intake part 310 and the second intake part 320 may be balanced at the lower portion at which the initial horizontal speed in the transfer direction T of the radical unit 10 is completely offset so that the radical unit is seated at a center without colliding with the side plate of the loading part 200.

In the system for manufacturing the secondary battery according to Embodiment 1 of the present invention, the pressure P320 of the second intake part may be constant over the upper and lower portions of the second side plate 222, and the pressure P310 of the first intake part may decrease from the upper portion of the first side plate 221 up to a preset point of the first side plate 221, but may be the same as the pressure P320 of the second intake part from the preset point of the first side plate 221 up to the lower portion of the first side plate 221. That is, the pressure P310 of the first intake part may be greater than the pressure P320 of the second intake part at the upper portion of the first side plate 221, and then, the pressure P310 of the first intake part may gradually decrease toward the lower portion of the first side plate 221, but may be the same as the pressure P320 of the second intake part from the preset point. That is, in the loading part 200, the intake pressure P310 by the first intake part is equal to or greater than the intake pressure P320 of the second intake part. Here, the preset point may mean a point at which the initial speed of the radical unit 10 in the horizontal direction is completely offset by the intake air pressure P300 of the intake part. When compared to Embodiment 2 to be described later, the net pressure required inside the loading part 200 may be generated even using a facility having a relatively low output to achieve the effect of preventing the radical unit 10 from colliding with the loading part 200.

Embodiment 2

Figure 7:
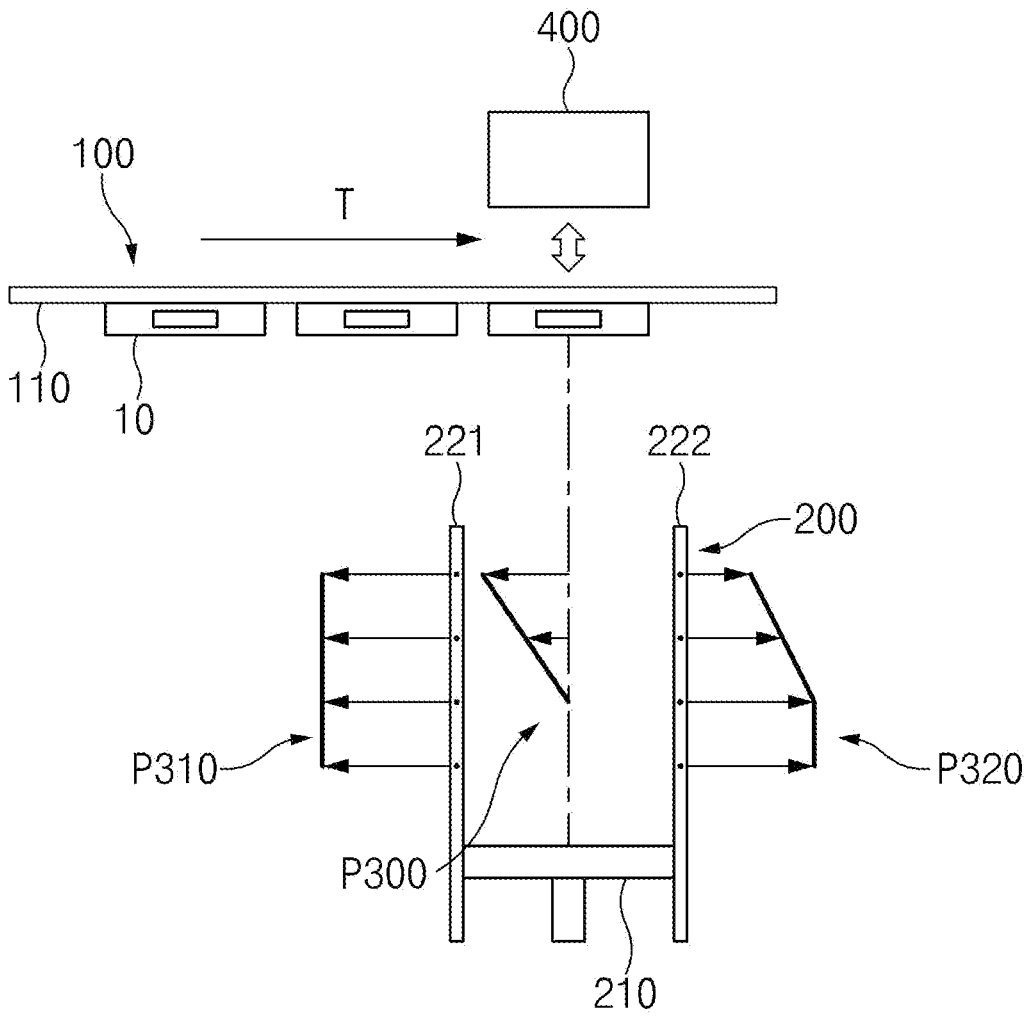
FIG. 7 is a view illustrating an intake pressure due to an intake part of a system for manufacturing a secondary battery according to Embodiment 2 of the present invention.

FIG. 7 is a view illustrating an intake pressure due to an intake part of a system for manufacturing a secondary battery according to Embodiment 2 of the present invention.

Embodiment 2 of the present invention is different from Embodiment 1 in that a pressure P310 of a first intake part is constant, and a pressure P320 of a second intake part varies according to a position. The contents that are duplicated with Embodiment 1 will be omitted as much as possible, and Embodiment 2 will be described with a focus on the differences. That is, it is obvious that the contents that are not described in Embodiment 2 may be regarded as the contents of Embodiment 1 if necessary.

Referring to FIG. 7, in a system for manufacturing a secondary battery according to Embodiment 2 of the present invention, the pressure p310 of the first intake part may be constant over upper and lower portions of a first side plate 221, and the pressure p320 of the second intake part may decrease from an upper portion of a second side plate 222 up to a preset point of the second side plate 222, but may be the same as the pressure P310 of the first intake part from the preset point of the second side plate 222 up to a lower portion of the second side plate 222. That is, the pressure P320 of the second intake part may be less than the pressure P310 of the first intake part at the upper portion of the second side plate 222, and then, the pressure P320 of the second intake part may gradually increase toward the lower portion of the second side plate 222, but may be the same as the pressure P310 of the first intake part from the preset point. Here, the preset point may be understood in the same as in the first embodiment.

In the case of the system for manufacturing the secondary battery according to Embodiment 2 of the present invention, like the case of Embodiment 1, the intake pressure may be generated in a reverse direction of a transfer direction T to prevent a radical unit 10 from colliding with a loading part 200, and also, when compared to Embodiment 1, after the radical units 10 are seated inside the loading part 200, a stronger air flow from an upper portion toward a lower portion of the loading part 200 may be generated to minimize a horizontal moving distance by a speed of the radical unit 10 in the transfer direction T.

Embodiment 3

Embodiment 3 of the present invention is different from Embodiments 1 and 2 in that Embodiments relates to a method for manufacturing a secondary battery by using the system for manufacturing the secondary battery according to each of Embodiments 1 and 2. The contents that are duplicated with Embodiments 1 and 2 will be omitted as much as possible, and Embodiment 3 will be described with a focus on the differences. That is, it is obvious that the contents that are not described in Embodiment 3 may be regarded as the contents of Embodiments 1 and 2 if necessary.

A method for manufacturing a secondary battery according to Example 3 of the present invention includes a process of transferring a radical unit 10 by a transfer part 100 and a process of loading the radical unit 10 in a loading part 200 by allowing the radical unit 10 to drop in a direction of gravity.

The loading process includes a pressing process of pressing the radical unit 10 to drop to the loading part 200 and an intake process of intaking air inside the loading part 200 from a side surface of the loading part 200 through an intake part 300. Particularly, in the intake process, air may be suctioned in a reverse direction of a transfer direction T from the inside of the loading part 200 to prevent the radical unit 10, which freely drops at an initial speed in the transfer direction, from colliding with the loading part 200 inside the loading part 200, thereby reducing folding short defects may occur in a subsequent process.

In the intake process, a first intake part 310 may suction the air inside the loading part 200 in the reverse direction of the transfer direction T, and a second intake part 320 may suction the air in the transfer direction. Here, a pressure P310 of the first intake part may be greater than a pressure P320 of a second intake part at an upper portion of the loading part 200, and a pressure P310 of the first intake part may be the same as a pressure P320 of the second intake part at a lower portion of the loading part 200. As a result, a net pressure may be generated in the reverse direction of the transfer direction T at the upper portion of the loading part 200, and the pressures P310 and the P320 by the first intake part 310 and the second intake part 320 may be balanced at the lower portion at which an initial horizontal speed in the transfer direction T of the radical unit 10 is completely offset so that the radical unit is seated at a center without colliding with a side plate of the loading part 200.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Radical unit
100: Transfer part
110: Transfer belt
200: Loading part
210: Lower plate
221: First side plate
221a: Intake hole 222: Second side plate
223: Third side plate
224: Fourth side plate
300: Intake part
310: First intake part
320: Second intake part
400: Pressing part
T: Transfer direction
P300: Intake pressure of intake part
P310: Intake pressure by first intake part
P320: Intake pressure by second intake part

The invention claimed is:

1. A system for manufacturing a secondary battery, the system comprising:
    a transfer part configured to transfer a radical unit;
    a loading part configured to allow the radical unit transferred by the transfer part to drop in a direction of gravity so as to load the radical unit; and
    an intake part configured to suction air inside an inner space of the loading part from a side surface of the loading part such that radical unit dropping in the inner space of the loading part is subjected to the suctioned air.

2. The system of claim 1, wherein the intake part is configured to generate a flow of the air in a reverse direction of a transfer direction in the inner space of the loading part.

3. The system of claim 2, wherein, in the intake part, an intake pressure gradually decreases from an upper portion toward a lower portion of the loading part.

4. The system of claim 1, further comprising a pressing part configured to press the radical unit transferred by the transfer part so that the radical unit drops into the loading part.

5. The system of claim 4, wherein the transfer part comprises a transfer belt configured to grip the radical unit at a top surface of the radical unit to transfer the radical unit.

6. The system of claim 5, wherein the transfer belt comprises a plurality of transfer belts spaced apart from each other in a direction vertical to a transfer direction of the radical unit, and
    the plurality of transfer belts grip one radical unit together to transfer the radical unit.

7. The system of claim 6, wherein the pressing part is configured to press the radical unit exposed between the plurality of transfer belts downward from an upper side so that the radical unit drops into the loading part.

8. The system of claim 1, wherein the loading part comprises:
    a lower plate on which the radical unit is seated;
    a first side plate formed as a surface perpendicular to one edge of the lower plate, wherein a normal vector direction of the surface is parallel to a transfer direction; and
    a second side plate formed to face the first side plate at another edge of the lower plate,
    wherein the first side plate is disposed closer to a transfer start point of the radical unit when compared to the second side plate.

9. The system of claim 8, wherein the intake part comprises a first intake part provided in the first side plate to suction the air in a reverse direction of the transfer direction of the transfer part.

10. The system of claim 9, wherein the first intake part is disposed over upper and lower portions of the first side plate.

11. The system of claim 9, wherein the intake part further comprises a second intake part provided in the second side plate to suction the air in the transfer direction of the transfer part.

12. The system of claim 11, wherein the second intake part is disposed over upper and lower portions of the second side plate.

13. The system of claim 12, wherein, in the intake part, a pressure of the first intake part is greater than a pressure of the second intake part at an upper portion of the loading part, and
    a pressure of the first intake part is the same as the pressure of the second intake part at a lower portion of the loading part.

14. The system of claim 13, wherein the pressure of the second intake part is constant over the upper and lower portions of the second side plate, and
    the pressure of the first intake part decreases from an upper portion of the first side plate up to a preset point of the first side plate, but is the same as the pressure of the second intake part from the preset point of the first side plate up to a lower portion of the first side plate.

15. The system of claim 13, wherein the pressure of the first intake part is constant over upper and lower portions of the first side plate, and
    the pressure of the second intake part increases from the upper portion of the second plate up to a preset point of the second side plate, but is the same as the pressure of the first intake part from the preset point of the second side plate up to the lower portion of the second side plate.

16. The system of claim 8, wherein the loading part further comprises:
    a third side plate formed to connect the first side plate to the second side plate at an edge of the lower plate; and
    a fourth side plate formed to connect the first side plate to the second side plate at the edge of the lower plate and face the third side plate.

17. A method for manufacturing a secondary battery, the method comprising:
    transferring a radical unit by a transfer part; and
    allowing the radical unit to drop in a direction of gravity to load the radical unit in a loading part,
    wherein the loading of the radical unit comprises:
        pressing the radical unit to drop into the loading part; and
        suctioning air within the loading part from a side surface of the loading part through an intake part.

18. The method of claim 17, wherein, a first intake part suctions the air within the loading part in a reverse direction of a transfer direction, and a second intake part suctions the air in the transfer direction,
    wherein a pressure of the first intake part is greater than a pressure of the second intake part at an upper portion of the lading part, and
    a pressure of the first intake part is the same as the pressure of the second intake part at a lower portion of the loading part.

* * * * *